(12) United States Patent
Dick et al.

(10) Patent No.: US 7,349,540 B2
(45) Date of Patent: *Mar. 25, 2008

(54) GENERATION OF USER EQUIPMENT IDENTIFICATION SPECIFIC SCRAMBLING CODE FOR HIGH SPEED SHARED CONTROL CHANNEL

(75) Inventors: Stephen G. Dick, Nesconset, NY (US); Nader Bolourchi, Larchmont, NY (US); Sung-Hyuk Shin, Northvale, NJ (US)

(73) Assignee: InterDigital Technology Corporation, Wilmington, DE (US)

( * ) Notice: Subject to any disclaimer, the term of this patent is extended or adjusted under 35 U.S.C. 154(b) by 572 days.

This patent is subject to a terminal disclaimer.

(21) Appl. No.: 10/779,431

(22) Filed: Feb. 13, 2004

(65) Prior Publication Data

US 2004/0166830 A1 Aug. 26, 2004

Related U.S. Application Data

(63) Continuation of application No. 10/187,640, filed on Jul. 1, 2002, now Pat. No. 6,973,579.

(60) Provisional application No. 60/378,170, filed on May 13, 2002, provisional application No. 60/378,509, filed on May 7, 2002.

(51) Int. Cl.
*H04N 7/167* (2006.01)
*H04B 1/00* (2006.01)

(52) U.S. Cl. ............... 380/210; 375/135; 375/146; 380/2

(58) Field of Classification Search ............... None
See application file for complete search history.

(56) References Cited

U.S. PATENT DOCUMENTS

| 3,569,956 A | 3/1971 | Duffy |
| 5,091,942 A | 2/1992 | Dent |
| 5,161,244 A | 11/1992 | Maurer |
| 5,365,588 A | 11/1994 | Bianco et al. |

(Continued)

FOREIGN PATENT DOCUMENTS

CA 2 228 714 1/1998

(Continued)

OTHER PUBLICATIONS

InterDigital Comm. Corp., "16 bit UE ID Based UE Specific Masking for HS-SCCH," Discussion and Decision, 3GPP TSG RAN WG1#26, Kyung-Ju, Korea, May 13-17, 2002.

(Continued)

*Primary Examiner*—Nasser Moazzami
*Assistant Examiner*—Brandon S Hoffman
(74) *Attorney, Agent, or Firm*—Volpe and Koenig, P.C.

(57) ABSTRACT

A user equipment is used in a code division multiple access communication system. The user equipment comprises circuitry configured to process a user equipment identification (UE ID) by ½ rate convolutionally encoding the UE ID to produce a code. The code is used by the user equipment for descrambling a high speed shared control channel (HS-SCCH). The user equipment comprises circuitry configured to receive payload data over a high speed physical downlink shared channel (HS-PDSCH) associated with the HS-SCCH.

30 Claims, 2 Drawing Sheets

U.S. PATENT DOCUMENTS

| | | | |
|---|---|---|---|
| 5,671,218 | A | 9/1997 | I et al. |
| 5,799,154 | A | 8/1998 | Kuriyan |
| 6,014,567 | A | 1/2000 | Budka |
| 6,188,717 | B1 | 2/2001 | Kaiser et al. |
| 6,385,183 | B1 | 5/2002 | Takeo |
| 6,493,331 | B1 | 12/2002 | Walton et al. |
| 6,539,047 | B1 * | 3/2003 | Moon .................... 375/135 |
| 6,553,535 | B1 | 4/2003 | Asada et al. |
| 6,567,461 | B1 | 5/2003 | Moon et al. |
| 6,731,618 | B1 | 5/2004 | Chung et al. |
| 6,802,033 | B1 | 10/2004 | Bertin et al. |
| 6,871,313 | B2 | 3/2005 | Gopalakrishnan |
| 6,917,603 | B2 | 7/2005 | Strawczynski et al. |
| 6,983,412 | B2 | 1/2006 | Fukumasa |
| 7,162,675 | B2 | 1/2007 | Das et al. |
| 2002/0018565 | A1 | 2/2002 | Luttrell et al. |
| 2002/0044542 | A1 | 4/2002 | Kim et al. |
| 2002/0075838 | A1 | 6/2002 | Choi et al. |
| 2002/0075964 | A1 | 6/2002 | Okumura |
| 2002/0114268 | A1 | 8/2002 | Kim et al. |
| 2003/0005388 | A1 | 1/2003 | Fukumasa |
| 2003/0048800 | A1 | 3/2003 | Kiffoyle et al. |
| 2003/0074476 | A1 | 4/2003 | Kim et al. |
| 2005/0063347 | A1 | 3/2005 | Sarkkinen et al. |

FOREIGN PATENT DOCUMENTS

| | | |
|---|---|---|
| GB | 2 259 226 | 3/1993 |
| JP | 02291737 | 12/1990 |
| KR | 2001 0063271 | 7/2001 |
| KR | 2003 0080306 | 10/2003 |
| WO | 97/16899 | 5/1997 |
| WO | 99/07076 | 2/1999 |
| WO | 99/18689 | 4/1999 |
| WO | 99/33271 | 7/1999 |
| WO | 00/41316 | 7/2000 |
| WO | 01/06662 | 1/2001 |
| WO | 01/18055 | 3/2001 |
| WO | 01/50675 | 7/2001 |
| WO | 02/05445 | 1/2002 |
| WO | 03/065618 | 8/2003 |

OTHER PUBLICATIONS

Siemens, "Simplified UE-ID Masking of HS-SCCH, Part 1," Discussion and Descision, Tdoc R1-02-0914, TSG-RAN Working Group 1 #27, Oulu, Finland, Jul. 2-5, 2002.

InterDigital Comm. Corp., "16 bit UE ID based UE Specific Masking for HS-SCCH: Updated for consistency with new Rate matching for HS-SCCH," Discussion and Decision, 3GPP TSG RAN WG1#27, Olou, Finland, Jul. 2-5, 2002.

"3rd Generation Partnership Project: Technical Specification Group Radio Access Network; Multiplexing and channel coding (FDD) (Release 5)," 3GPP TS 25.212 v5. 1.0-DRAFT, Jun. 2002.

Lucent Technologies, "Way forward on HS-SCCH coding," 3GPP TSG-RAN WG1#25, Paris, France, Apr. 2002, R1-02-0553, pp. 1-6.

Lucent Technologies, "Pre-coding of UE ID before Modulo 2 addition with CRC," 3GPP TSG-RAN WG1#125, Apr. 2002, R1-02-055.

Nokia, "Channel coding and error detection for HS-SCCH," TSG-RAN WG1 #23, 3GPP, Jan. 2002, R1-02-0016.

InterDigital Comm. Corp., "16 bit UE ID Based UE Specific Masking for HS-SCCH," 3GPP TSG RAN WG1#26, R1-02-0715, Kyung-Ju, Korea, May 13-17, 2002.

3GPP TR 25.858, "Technical Specification Group Radio Access Network; High Speed Downlink Packet Access; Physical Layer Aspects," 3rd Generation Partnership Project; V5.0.0, 3GPP, (Release 5) Mar. 2002, pp. 1-31.

Motorola, TSG RAN WG1 Meeting #24, "Performance of the HS-SCCH", http://www.3gpp.org/ftp/TSG_RAN/WG1_RL1/TSGR1_/Docs/Zips/R1-02-0610.zip, Apr. 2002.

"3rd Generation Partnership Project; Technical Specification Group Radio Access Network, Multiplexing and Channel Coding (FDD) (Release 5)", 3GPP TS 25.212 V5.0.0, Mar. 2002.

Siemens, "UE Specific Bit Scrambling for TDD HS-SCCH", 3GPP TSG RAN WG1 Meeting #25, Tdoc R1-02-0400, Feb. 9-12, 2002.

Siemens, "Coding and Rate Matching for HS-SCCH", TSG RAN WG1 Meeting #25, Tdoc R1-02-0604, Paris, France, Apr. 9-12, 2002.

Siemens, "Rate Matching and Channel Coding for HS-SCCH", 3GPP TSG-RAN1 Meeting #25 R1-02-0605, Paris France, Apr. 9-12, 2002.

Siemens, "Improved HS-SCCH Detection Performance", TSG-RAN WG1 Meeting #25, Tdoc R1-02-0608, Paris France, Apr. 9-12, 2002.

Siemens, "UE Specific Bit Scrambling for TDD HS-SCCH", 3GPP TSG-Ran WG1 Meeting #26, Tdoc R1-02-0739, Gyeongju, Korea, May 13-16, 2002.

Siemens, "UE Specific Masking for HS-SCCH", TSG-RAN WG1 Meeting #26, R1-02-0783, Gyeongju, Korea, May 13-16, 2002.

Siemens, "Revision of UE Specific Masking for HS-SCCH", 3GPP TSG-RAN WG1 Meeting #28, Tdoc 0783, Gyeongju, Korea, May 13-16, 2002.

Siemens, "Revisions of UE Specific Masking for HS-SCCH", 3GPP TSG-RAN WG1 Meeting #28, Tdoc R1-02-0934, Gyeongju, Korea, May 13-16, 2002.

LG Electronics, "UE-Specific Scrambling Code (USSC) for HS-SCCH: USSC based on a scrambling code with time-varying property", Tdoc R1-02-0541, TSG-RAN WG1 Meeting #26, Gyeongju, Korea, May 13-16, 2002.

LG Electronics, "On User-Specific Scrambling Code for the Part 1 of HS-SCCH", Tdoc R1-02-0542, TSG-RAN WG1 Meeting #25, Apr. 9-12, 2002.

LG Electronics, "User-Specific Masking Codes for HS-SCCH", Tdoc R1-02-0543, 3GPP TSG-RAN WG1 Meeting #25, Paris, France, Apr. 9-12, 2002.

LG Electronics, "On the Criterion for UE Specific Scrambling Code", TSGR1#26-02-0771, 3GPP TSG-RAN WG1 Meeting #26, Gyeongju, Korea, May 13-17, 2002.

InterDigital Comm. Corp., "Discussion on UE Specific Masking for HS-SCCH," 3GPP TSG RAN WG1#26, R1-02-0716, Gyeongju, Korea, May 13-17, 2002.

InterDigital Comm. Corp., "UE Specific Masking for HS-SCCH, part 1" 3GPP TSG RAN WG1#26, R1-02-0717, Gyeongju, Korea, May 13-17, 2002.

InterDigital Comm. Corp., "UE Specific Masking for HS-SCCH part 1," 3GPP TSG RAN WG1#26, R1-02-0821, Gyeongju, Korea, May 13-17, 2002.

InterDigital Comm. Corp., "UE Specific Masking for HS-SCCH part 1," 3GPP TSG RAN WG1#26, R1-02-0830, Gyeongju, Korea, May 13-17, 2002.

InterDigital Comm. Corp., "UE Specific Masking for HS-SCCH part 1," 3GPP TSG RAN WG1#26, R1-02-0843, Gyeongju, Korea, May 13-17, 2002.

InterDigital Comm. Corp., "UE Specific Masking for HS-SCCH part 1," 3GPP TSG RAN WG1#26, R1-02-0850, Gyeongju, Korea, May 13-17, 2002.

InterDigital Comm. Corp., "UE Specific Masking for HS-SCCH part 1," 3GPP TSG RAN WG1#26, R1-02-0858, Gyeongju, Korea, May 13-17, 2002.

InterDigital Comm. Corp., "UE Specific Masking for HS-SCCH part 1," 3GPP TSG RAN WG1#26, R1-02-0859, Gyeongju, Korea, May 13-17, 2002.

InterDigital Comm. Corp., "16 bit UE Based UE Specific Masking for HS-SCCH: Updated for consistency with new Rate matching for HS-SCCH", , 3GPP TSG RAN WG1#27, R1-02-0941, Oulu, Finland, Jul. 2-5, 2002.

InterDigital Comm. Corp., "Correction to UE specific matching for HS-SCCH part 1," 3GPP TSG RAN WG1#27, R1-02-0941, Oulu, Finland, Jul. 2-5, 2002.

Lucent Technologies, "Performance of the HS-SCCH", 3GPP TSG-RAN WG1#25, R1-02-0649, Paris France, Apr. 9-12, 2002.

Lucent Technologies, "Comparison of Detection Schemes for the HS-SCCH", 3GPP TSG-RAN WG1#25, R1-02-0699, Gyeongju, Korea, May 13-16, 2002.

Lucant Technologies, "False Alarm Performance of various UE ID Coding, Scrambling and CRC schemes", 3GPP TSG-RAN WG1#26, R1-02-0723, Gyeongju, Korea, May 13-16, 2002.

Lucent Technologies, "Further Results on SCCH Detection with Parity Bits", R1-02-0903, 3GPP TSG-RAN WG1#27, Oulu, Finland, Jul. 2-4, 2002.

Lucant Technologies, "UE procedures (HS-SCCH) to support HSDPA enhancements", R1-02-0904, 3GPP TSG-RAN WG1#27, Oulu, Finland, Jul. 2-4, 2002.

Motorola, "Performance of the HS-SCCH with different code rates", R1-02-0718, TSG RAN WG1 Meeting #26, Gyeongju, Korea, May 13-16, 2002.

NEC, "Coding for HS-SCCH", R-1-02-0964, 3GPP TSG-RAN WG1 Meeting #27, Oulu, Finland, Jul. 2-5, 2002.

NEC, "Coding for HS-SCCH", R-1-02-1121, 3GPP TSG-RAN WG1 Meeting #28, Seattle, Washington, Aug. 19-22, 2002.

Panasonic, "Removal of code mapping description over HS-SCCH", Tdoc R1(02)0774, 3GPP TSG-RAN WG1 Meeting #25, Paris France, Apr. 9-12, 2002.

Texas Instruments, "HS-SCCH: Performance results and improved structure", R1-02-0637, 3GPP TSG RAN WG1 Meeting #25, Paris, France, Apr. 9-12, 2002.

"3$^{rd}$ Generation Partnership Project: Technical Specification Group Radio Access Network; Multiplexing and channel coding (FDD) (Release 5)," 3GPP TS 25.212 v5. 0.0 (Mar. 2002).

InterDigital Comm. Corp., "16 bit UE ID Based UE Specific Masking for HS-SCCH," Discussion and Decision, 3GPP TSG RAN WG1#26, Kyung-Ju, Korea, May 13-17, 2002.

Siemens, "Simplified UE-ID Masking of HS-SCCH, Part 1," Discussion and Decision, Tdoc R1-02-0914, TSG-RAN Working Group 1 #27, Oulu, Finland, Jul. 2-5, 2002.

InterDigital Comm. Corp., "16 bit UE ID Based UE Specific Masking for HS-SCCH: Updated for consistency with new Rate matching for HS-SCCH," Discussion and Decision, 3GPP TSG RAN WG1#27, Olou, Finland, Jul. 2-5, 2002.

"3$^{rd}$ Generation Partnership Project: Technical Specification Group Radio Access Network; Multiplexing and channel coding (FDD) ( Release 5)," 3GPP TS 25.212 v5. 1.0-DRAFT, Jun. 2002.

Lucent Technologies, "Way forward on HS-SCCH coding," 3GPP TSG-RAN WGa#25, Paris, France, Apr. 2002, R1-02-0553, pp. 1-6.

Lucent Technologies, "Pre-coding of UE ID before Modulo 2 addition with CRC," 3GPP TSG-RAN WG1#25, Paris, France, Apr. 2002, R1-02-0555.

Nokia, "Channel coding and error detection for HS-SCCH," TSG-RAN WG1 #23, 3GPP, Jan. 2002, R1-02-0016.

InterDigital Comm. Corp., "16 bit UE ID Based UE Specific Masking for HS-SCCH," 3GPP TSG RAN WG1#26, R1-02-0715, Kyung-Ju, Korea, May 13-17, 2002.

3GPP TR 25.858, "Technical Specification Group Radio Access Network; High Speed Downlink Packet Access; Physical Layer Aspects," 3$^{rd}$ Generation Partnership Project; V5.0.0, 3GPP, (Release 5) Mar. 2002, pp. 1-31.

Motorola , TSG RAN WG1 Meeting #24, "Performance of the HS-SCCH", http://www.3gpp.org/ftp/TSG_RAN/WG1_RL1/TSGR1_/Docs/Zips/R1-02-0610.zip, Apr. 2002.

"3$^{rd}$ Generation Partnership Project; Technical Specification Group Radio Access Network, Multiplexing and Channel Coding (FDD) (Release 5)", 3GPP TS 25.212 V5.0.0, Mar. 2002.

Siemens, "UE Specific Bit Scrambling for TDD HS-SCCH", 3GPP TSG RAN WG1 Meeting #25, Tdoc R1-02-0400, Feb. 9-12, 2002.

Siemens, "Coding and Rate Matching for HS-SCCH", TSG RAN WG1 Meeting #25, Tdoc R1-02-0604, Paris, France, Apr. 9-12, 2002.

Siemens, "Rate Matching and Channel Coding for HS-SCCH", 3GPP TSG-RAN1 Meeting #25 R1-02-0605, Paris France, Apr. 9-12, 2002.

Siemens, "Improved HS-SCCH Detection Performance", TSG-RAN WG1 Meeting #25, Tdoc R1-02-0608, Paris, France, Apr. 9-12, 2002.

Siemens, "UE Specific Bit Scrambling for TDD HS-SCCH", 3GPP TSG-Ran WG1 Meeting #26, Tdoc R1-02-0739, Gyeongju, Korea, May 13-16, 2002.

Siemens, "UE Specific Masking for HS-SCCH", TSG-RAN WG1 Meeting #26, Tdoc R1-02-0783, Gyeongju, Korea, May 13-16, 2002.

Siemens, "Revision of UE Specific Masking for HS-SCCH", 3GPP TSG-RAN WG1 Meeting #28, Tdoc 0783, Gyeongju, Korea, May 13-16, 2002.

Siemens, "Revision of UE Specific Masking for HS-SCCH", 3GPP TSG-RAN WG1 Meeting #28, Tdoc R1-02-0934, Gyeongju, Korea, May 13-16, 2002.

LG Electronics, "UE-Specific Scrambling Code (USSC) for HS-SCCH: USSC based on a scrambling code with time-varying property", Tdoc R1-02-0541, TSG-RAN WG1 Meeting #26, Gyeongju, Korea, May 13-16, 2002.

LG Electronics, "On User-Specific Scrambling Code for the Part 1 of HS-SCCH", Tdoc R1-02-0542, TSG-RAN WG1 Meeting #25, Apr. 9-12, 2002.

LG Electronics, "User-Specific Masking Codes for HS-SCCH", Tdoc R1-02-0543, 3GPP TSG-RAN WG1 Meeting #25, Paris, France, Apr. 9-12, 2002.

LG Electronics, "On the Criterion for UE Specific Scrambling Code", TSGR1#26-02-0771, 3GPP TSG-RAN WG1 Meeting #26, Gyeongju, Korea, May 13-17, 2002.

InterDigital Comm. Corp., "Discussion on UE Specific Masking for HS-SCCH," 3GPP TSG-RAN WG1#26, R1-02-0716, Gyeongju, Korea, May 13-17, 2002.

InterDigital Comm. Corp., "UE Specific Masking for HS-SCCH, part 1" 3GPP TSG-RAN WG1#26, R1-02-0717, Gyeongju, Korea, May 13-17, 2002.

InterDigital Comm. Corp., "UE Specific Masking for HS-SCCH, part 1" 3GPP TSG-RAN WG1#26, R1-02-0821, Gyeongju, Korea, May 13-17, 2002.

InterDigital Comm. Corp., "UE Specific Masking for HS-SCCH, part 1" 3GPP TSG-RAN WG1#26, R1-02-0830, Gyeongju, Korea, May 13-17, 2002.

InterDigital Comm. Corp., "UE Specific Masking for HS-SCCH, part 1" 3GPP TSG-RAN WG1#26, R1-02-0843, Gyeongju, Korea, May 13-17, 2002.

InterDigital Comm. Corp., "UE Specific Masking for HS-SCCH, part 1" 3GPP TSG-RAN WG1#26, R1-02-0850, Gyeongju, Korea, May 13-17, 2002.

InterDigital Comm. Corp., "UE Specific Masking for HS-SCCH, part 1" 3GPP TSG-RAN WG1#26, R1-02-0858, Gyeongju, Korea, May 13-17, 2002.

InterDigital Comm. Corp., "UE Specific Masking for HS-SCCH, part 1" 3GPP TSG-RAN WG1#26, R1-02-0859, Gyeongju, Korea, May 13-17, 2002.

InterDigital Comm. Corp., "16 bit UE Based Specific Masking for HS-SCCH: Updated for consistency with new Rate matching for HS-SCCH", 3GPP TSG-RAN WG1#27, R1-02-0941, Oulu, Finland, Jul. 2-5, 2002.

InterDigital Comm. Corp., "Correction to UE specific matching for HS-SCCH, part 1" 3GPP TSG-RAN WG1#27, R1-02-0941, Oulu, Finland, Jul. 2-5, 2002.

Lucent Technologies, "Performance of the HS-SCCH", 3GPP TSG-RAN WG1#25, R1-02-0649, Paris, France, Apr. 9-12, 2002.

Lucent Technologies, "Comparison of Detection Schemes for the HS-SCCH", 3GPP TSG-RAN WG1#25, R1-02-0699, Gyeongju, Korea, May 13-16, 2002.

Lucent Technologies, "False Alarm Performance of various UE ID Coding, Scrambling and CRC schemes", 3GPP TSG-RAN WG1#26, R1-02-0723, Gyeongju, Korea, May 13-16, 2002.

Lucent Technologies, "Further Results on SCCH Detection with Parity Bits", R1-02-0903, 3GPP TSG-RAN WG1#27, Oulu, Finland, Jul. 2-4, 2002.

Lucent Technologies, "UE Procedures (HS-SCCH) to support HSDPA enhancements", R1-02-0904, 3GPP TSG-RAN WG1#27, Oulu, Finland, Jul. 2-4, 2002.

Motorola, "Performance of the HS-SCCH with different code rates", R1-02-0718, TSG-RAN WG1#26, Gyeongju, Korea, May 13-16, 2002.

NEC, "Coding for HS-SCCH", R-1-02-0964, 3GPP TSG-RAN WG1 Meeting #27, Oulu, Finland, Jul. 2-5, 2002.
NEC, "Coding for HS-SCCH", R-1-02-1121, 3GPP TSG-RAN WG1 Meeting #28, Seattle, Washington, Aug. 19-22, 2002.
Panasonic, "Removal of code mapping description over HS-SCCH", Tdoc R1(02)0774, 3GPP TSG-RAN WG1 Meeting #25, Paris France, Apr. 9-12, 2002.
Texas Instruments, "HS-SCCH: Performance results and improved structure", R1-02-0637, 3GPP TSG-RAN WG1 Meeting #25, Paris, France, Apr. 9-12, 2002.
"3rd Generation Partnership Project: Technical Specification Group Radio Access Network; Multiplexing and Channel Coding (FDD) (Release 5)," 3GPP TS 25.212 v5. 0.0 (Mar. 2002).
Motorola, "Way Forward on HS-SCCH," TSG RAN WG1 Meeting #24, R1-02-0463, Orlando, Florida, Feb. 18-22, 2002.
Siemens, "UE Specific Masking for HS-SCCH," TSG RAN WG1 Meeting #24, R1-02-0482, Orlando, Florida, Feb. 18-22, 2002.
Motorola, "Text Proposal for HS-DOC," TSG RAN Working Group 1 #24, Tdoc R1-02-0490, Orlando, Florida, Feb. 18-22, 2002.
Siemens, "Improved UE Specific CRC Generation," 3GPP TSG RAN WG1#25, Tdoc R1-02-0493, Paris. France, Feb. 1-12, 2002.
Lucent Technologies, "Performance of the HS-SCCH," 3GPP TSG-RAN WG1#25, R1-02-0529, Paris, France, Apr. 9-12, 2002.
Texas Instruments, "HS-SCCH: Performance Results and Improved Structure," 3GPP TSG-RAN WG1 Meeting #25, R1-02-0535, Paris, France, Apr. 9-12, 2002.
InterDigital Communication Corporation, "Simplified Illustration of the Performance Benefit of US Dependent CRC," TSG-RAN Working Group 1 #21, R1-01-0972, Torino, Italy, Aug. 27-31, 2001.
InterDigital Communication Corporation, "Implicit UE Identification for HSDPA Downlink Signaling," TSG-RAN Working Group 1 #22, R1-01-0810, Torino, Italy, Aug. 27-31, 2001.
Lucent Technologies, "Comparison of Schemes for UE Specific CRC," TSG-RAN WG1 #23, R1-01-0076, Espoo, Finland, Jan. 8-11, 2002.
Lucent Technologies, "Comparison of Schemes for UE Specific CRC," TSG-RAN WG1 #24, R1-02-0416, Orlando, Florida, Feb. 18-22, 2002.
"3rd Generation Partnership Project: Technical Specification Group Access Network; High Speed Downlink Packet Access: Physical Layer Aspects (Release 5)," 3GPP TR 25.858 V5.0.0 (Mar. 2003).
"Draft Minutes of WG1 #21 Meeting," TSG-RAN Working Group 1 Meeting No. 22, TSGR1-01-0990, New York, Oct. 23-26.
"Draft Minutes of WG1 #22 Meeting," TSG-RAN Working Group 1 Meeting No. 23, TSGR1-01-1354, Espoo, Finland, Jan. 8-11.
"Revised Minutes of TSG RAN WG1 #23 Meeting," TSG-RAN Working Group 1 Meeting No. 24, TSGR1-02-0356, Orlando, Florida, Feb. 18-22.
"Revised Minutes of TSG-RAN WG1 #24," TSG-RAN Working Group 1 Meeting No. 25, TSGR1-02-0575, Paris, France, Apr. 9-12.
"Revised Minutes of TSG RAN WG1 #25 Meeting," TSG-RAN Working Group 1 Meeting No. 25, TSGR1-02-0791.
"3rd Generation Partnership Project: Technical Specification Group Access Network; High Speed Downlink Packet Access (HDSPA); Overall Description; Stage 2 (Release 5)," 3GPP TR 25.308 V5.2.0 (Mar. 2003) Technical Specification.
ETSI TS 125 212 v5.0.0 (May 2003) Technical Specification,"Universal Mobile Telecommunications System (UMTS); Multiplexing and Channel Coding (FDD) (3GPP TS 25.212 version 5.0.0 Release 5)" (European Telecommunication Standards Institute, 2002).
"3rd Generation Partnership Project: Technical Specification Group Access Network; High Speed Downlink Packet Access: Physical Layer Aspects (Release 5)," 3GPP TR 25.858 V1.0.0 (Dec. 2001) Technical Report.
"3rd Generation Partnership Project: Technical Specification Group Access Network; Multiplexing and channel coding (TDD) (Release 4)," 3GPP TS 25.222 V4.2.0 (Dec. 2001) Technical Specification.
"3rd Generation Partnership Project: Technical Specification Group Access Network; Multiplexing and channel coding (TDD) (Release 5)," 3GPP TS 25.222 V5.2.0 (Sep. 2002) Technical Specification.
Public Version of Respondents Samsung Electronics America, Inc.'s and Samsung Telecommunications America LLC's Response to the Complaint and Notice of Investigation, In the Matter of Certain 3G Wideband Code Division Multiple Access (WCDMA) Handsets and Components Thereof, Investigation No. 337-TA-601, May 31, 2007.
3GPP, 3rd Generation Partnership Project (3GPP); Technical Specification Group Access Network; Multiplexing and channel coding (FDD), 3G TS 25.212 Version 3.0.0 (Oct. 1999).
TR 25.858, v1.0.4, 3GPP TSG RAN #23, Jan. 8-11, 2002, Espoo, Finland, R1-02-0199.
Chen, W. et al. "A novel code assignment scheme for W-CDMA systems", Vehicular Technology Conference, 2001. VTC 2001 Fall. IEEE VTS 54th.
Cheng, R. et al. "OVSF Code Channel Assignment for IMT-2000", Vehicular Technology Conference Proceedings, 2000. VTC 2000-Spring Tokyo, 2000.
CWTS/Huawei Technologies Co., Ltd., "Discussion About SCCH-HS channel coding and necessity of transmission of HI", R1-02-0114, (Jan. 2002).
TIA/EIA Interim Standard "Mobile Station-Base Station Compatibility for Dual-Mode Wideband Spread Spectrum Cellular System", TIA/EIA-IS-9-5A, (May 1995).
Ericsson, "Shared control Channel, detailed structure (revision of R1-01-1115)", R1-01-1051, 3GPP TSG-RAN1 #22 Nov. 19-23, 2001, Cheju, Korea.
GSM Digital cellular telecommunications system (Phase 2+); Channel coding (GSM 05-03), V5.0.0, Mar. 1996.
Lin et al., "Error Control Coding: Fundamentals and Applications", Prentice Hall Inc., (Englewood Cliffs, 1983).
Lucent Technologies, "Coding for the Shared control channel (HS-SCCH)", R1-01-1061, 3GPP TSG-RAN WG1#22, JeJu, Korea, Nov. 19-23, 2001.
Lucent Technologies, "Basis for Comparing HS-SCCH Coding Schemes", R1-02-0071, 3GPP TSG-RAN WG1#23, Korpilampi, Finland, Jan. 8-11, 2002.
Minn, T. et al. "Dynamic Assignment of Orthogonal Variable-Spreading-Factor Codes in W-CDMA", IEEE Journal on selected Areas in Communications, vol. 18, No. 8, Aug. 2000.
Motorola, "Comments on the Requirements for UE ID when HS-DSCH Indicator (HI) bit is present for High Speed Downlink Packet Access (HSDPA) Downlink Signaling", R1-01-0758, TSG-RAN Working Group 1 #21, Korpilampi, Finland, Jun. 26-28, 2001.
Motorola, "Performance of SCCH-HS with various coding options", R1-02-0039, TSG-RAN Working Group 1#23, Espoo, Finland, Jan. 8-11, 2001.
Motorola, "Sizing of the HSDPA control channels", R1-01-1210, TSG-RAN Working Group 1#23, JeJu, Korea, Nov. 19-23, 2001.
Qualcomm, "CCH-HS structure, coding & timing", 3GPP TSG-RAN1 #23, R1-02-0156, Jan. 8-11, 2002, Espoo, Finland.
Qualcomm, "CCH-HS—Summary", R1-02-0157, 3GPP TSG-RAN1 #23, Jan. 8-11, 2002, Espoo, Finland.
Qualcomm, "DL HSDPA control structure", R1-01-1264, TSG-RAN WG 1 #22, Jeju, Korea, Nov. 19-23, 2001.
Samsung, "An efficient signaling on SCCH-HS and channel coding of SCCH-HS", TSG-RAN Working Group 1 Meeting #23, R1-02-0051, Espoo, Finland, Jan. 8-11, 2002.
Samsung, "Position of New Data Indicator", RAN WG1 meeting #22, Jeju, Koea, Nov. 19-23, 2001, R1-01-1175.
Siemens, "Changes to 25.212 for HSDPA work item"; 3GPP TSG RAN WG1 Meeting #24, Orlando, USA, Feb. 18-22, 2002, R1-02-0492.
Siemens, "Rate Matching and Channel Coding for HS-SCCH", 3GPP TSG-RAN1, Meeting #25, Paris, France, Apr. 9-12, 2002, R1-02-0605.
Siemens, "Discussion on channel coding schemes for the physical downlink shared control channel (HS-SCCG)", TSG-RAN Working Group 1 meeting #22, Nov. 19-23, 2001, Jeju, Korea, R1-01-1131.
Siemens, "Structure of the downlink shared control channel for HSDPA", TSG-RAN Working Group 1 ad Hoc meeting on HSDPA, R1-01-1030, Nov. 5-7, 2001, Sophia-Antipolis, France.
Draft minutes of TSG RAN WG1 #24 meeting, TSG-RAN Working Group 1 meeting No. 25, Apr. 9-12, Paris, France, TSGR1-02-0520.

Revised minutes of TSG RAN WG1 #26 meeting, TSG RAN Working Group 1, Meeting No. 27, TSGR1-02-0927, Jul. 2-5, Oulu, Finland.

Revised minutes of TSG-RAN Working Group 1 meeting No. 28, TSG RAN Working Group 1 meeting No. 28, Aug. 19-22, Seattle, WA, USA, TSGR1-02-1022.

Expert Report of Dr. Apostolos K. Kakaes Regarding Invalidity of U.S. Patent No. 6,973,579, In the Matter of Certain 3G Wideband Code Division Multiple Access (WCDMA) Handsets and Components Thereof, (Oct. 17, 2007).

* cited by examiner

GENERATION OF USER EQUIPMENT IDENTIFICATION SPECIFIC SCRAMBLING CODE FOR HIGH SPEED SHARED CONTROL CHANNEL

CROSS REFERENCE TO RELATED APPLICATION(S)

This application is a continuation of U.S. patent application Ser. No. 10/187,640, filed Jul. 1, 2002, now U.S. Pat. No. 6,973,579, which in turn claims priority from U.S. Provisional Application No. 60/378,170, filed May 13, 2002, and from U.S. Provisional Application No. 60/378,509, filed May 7, 2002, which are incorporated by reference as if fully set forth.

BACKGROUND

The present invention relates to wireless communication systems. More particularly, the present invention relates to user equipment identification specific scrambling sequences for high speed shared control channels (HS-SCCH).

A high speed downlink packet access (HSDPA) is proposed for wideband code division multiple access communication systems. HSDPA allows for high downlink data rates to support multimedia services.

To support HSDPA, high speed shared control channels (HS-SCCHs) are used. The HS-SCCHs are used to signal vital control information to the user equipments (UEs). Each HS-SCCH has two parts, referred to as Part-1 and Part-2. Part-1 carries time critical information needed by the UE. This information includes the channelization code set and the modulation type used by the high speed physical downlink shared control channel (HS-PDSCH) which carries the HSDPA payload. This information is vital to support HSDPA, since HSDPA uses adaptive modulation and coding (AMC).

To obtain its Part-1 information, each HSDPA UE monitors up to four HS-SCCHs for its information. The information for a particular UE is distinguished from other UEs by its UE identification (UE ID) specific scrambling sequence. The UE processes each monitored HS-SCCH with its UE ID specific scrambling sequence to detect the HS-SCCH intended for the UE. After processing, the UE determines on which HS-SCCH, if any, information was carried using its scrambling sequence. The UE descrambles the data carried on Part-1 of its HS-SCCH using its scrambling sequence.

Until recently, a 10 bit UE ID was used as the basis for the UE ID specific scrambling sequence. In this case, this UE ID was converted into a 40 bit scrambling sequence. To turn the 10 bit UE ID into the 40 bit UE ID specific scrambling sequence, the 10 bit UE ID is processed by a Reed-Muller block to produce a 32 bit code. The first 8 bits of the produced code are repeated and appended onto the back of the 32 bit code to produce a 40 bit code.

Although it is proposed to extend the UE ID length to 16 chips, the current proposal for the HS-SCCHs uses a 10 bit UE ID. This UE ID is converted into a 40 bit scrambling sequence. To turn the 10 bit UE ID into the 40 bit scrambling sequence, the 10 bit UE ID is processed by a Reed-Muller block to produce a 32 bit code. The first 8 bits of the produced code are repeated and appended onto the back of the 32 bit code to produce a 40 bit code.

To reduce the occurrence of false detections, it is desirable to have good separation between the produced scrambling codes for each UE ID. Accordingly, it is desirable to have alternate approaches to producing scrambling codes.

SUMMARY

A code is produced for use in scrambling or descrambling data associated with a high speed shared control channel (HS-SSCH) for a particular user equipment. A user identification of the particular user equipment comprises L bits. A ½ rate convolutional encoder processes at least the bits of the user identification by a ½ rate convolutional code to produce the code.

BRIEF DESCRIPTION OF THE DRAWING(S)

DETAILED DESCRIPTION OF THE PREFERRED EMBODIMENT(S)

Figure 1A:
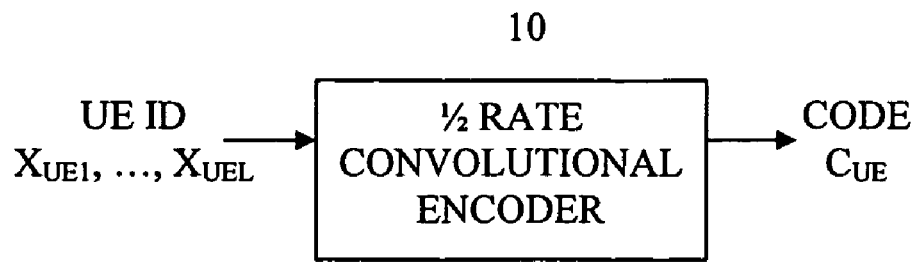
FIG. 1A is a preferred diagram of a circuit for producing a code associated with a particular user for a HS-SCCH.
Figure 1B:
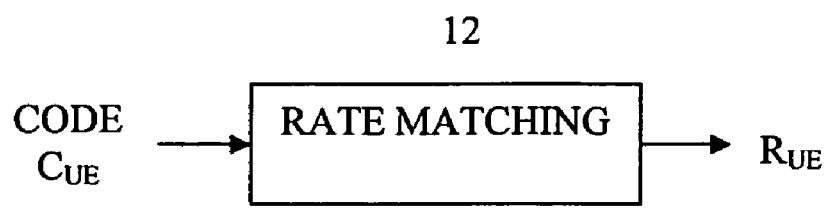
FIG. 1B is a diagram of a rate matching block used in conjunction with FIG. 1A.

Although the preferred embodiments are described in conjunction with the preferred application of the invention for use with the HSDPA of the third generation partnership project (3GPP) wideband code division multiple access (W-CDMA) communication system, the invention can be applied to other code division multiple access communication systems. FIGS. 1A and 1B are diagrams of a preferred UE ID specific scrambling sequence circuit. A UE ID, XUE, of length L is input into the circuit. L can be any length, such as 8 bits, 10 bits, 16 bits, etc. The UE ID, XUE={XUE1, . . . , XUEL}, is input into a ½ rate convolutional encoder 10 as shown in FIG. 1A. Along with the UE ID, extra bits, such as zeros, may be added to the end of the input string to extend the length of the input string and, accordingly, the output string. The use of a ½ rate convolutional encoder 10 provides for a high level of code separation between the output strings produced by different UE IDs. Additionally, current proposed 3GPP W-CDMA communication systems utilize a ½ rate convolutional encoder 10 for a forward error correction (FEC) technique. Accordingly, no additional hardware is required to generate the convolutionally encoded UE ID specific scrambling sequence. After encoding, based on the length of the output string, a rate matching stage 12 may be added to puncture bits to obtain a desired string length.

Figure 2A:
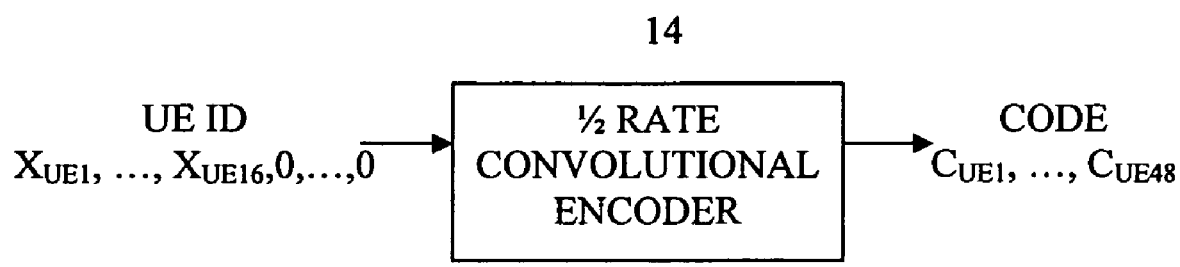
FIG. 2A is a preferred diagram of a circuit for producing a code associated with a user identification of 16 bits.
Figure 2B:
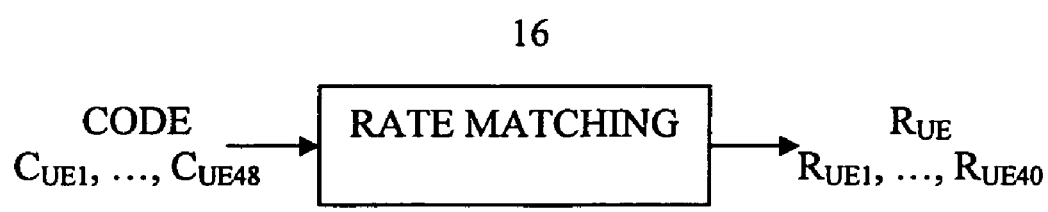
FIG. 2B is a diagram of a rate matching block used in conjunction with FIG. 2A.

FIGS. 2A and 2B are diagrams of preferred UE ID specific scrambling sequence circuit for a preferred UE ID codes of length 16, L=16. The 16 bit UE ID, XUE={XUE1, . . . , XUE16}, is input into a ½ rate convolutional encoder 14 along with eight zero bits appended onto the end of the input string. As a result, the input string is XUE1, . . . , XUE16, 0, 0, 0, 0, 0, 0, 0, 0. After being processed by the ½ rate convolutional encoder 14, the output code is 48 bits in length, CUE={CUE1, . . . , CUE48}.

To reduce the length of the code to a preferred length of 40 bits, eight bits are preferably punctured. FIG. 2B illustrates the rate matching stage 16 to perform the puncturing.

After the rate matching stage 16, the effective length of the scrambling code is 40 bits.

Figure 4:
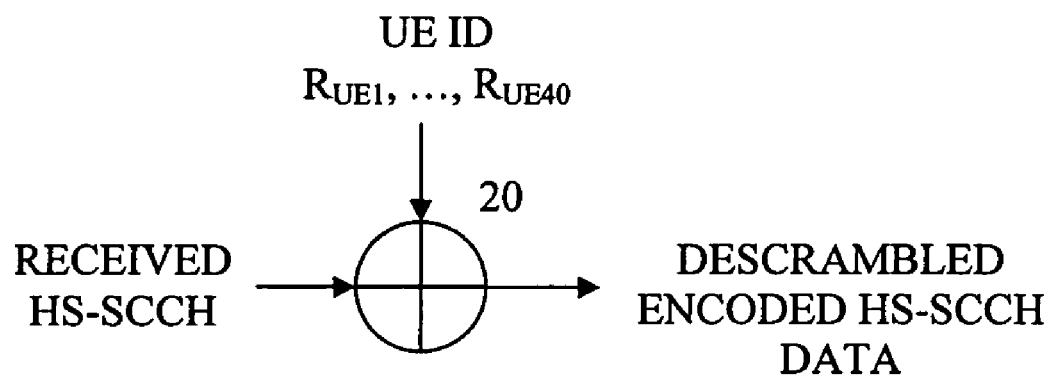
FIG. 4 is a simplified base station using the UE ID specific scrambling code.

FIG. 4 is a simplified diagram of a user equipment descrambling a HS-SCCH using the UE ID specific scrambling code. The UE ID scrambling code is mixed, such as by exclusive-or gate 20, with the received HS-SCCH for use in recovering the encoded HS-SCCH data.

Figure 3:
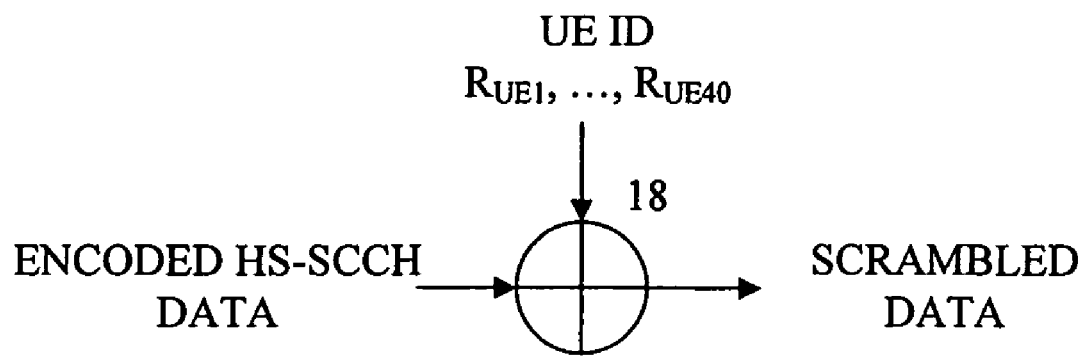
FIG. 3 is a simplified user equipment using the UE ID specific scrambling code.

FIG. 3 is a simplified diagram of a base station scrambling encoded data with the UE ID specific scrambling code for transfer over the HS-SCCH. The encoded data is mixed with the UE ID scrambling code, such as by an exclusive-or gate 18, for a particular user. The scrambled data is used to produce the HS-SCCH for transfer to the particular user.

What is claimed is:

1. A user equipment for use in a code division multiple access communication system, the user equipment comprising:
    circuitry configured to process a user equipment identification (UE ID) by ½ rate convolutionally encoding the UE ID to produce a code used by the user equipment for descrambling a high speed shared control channel (HS-SCCH); wherein the user equipment is configured to receive a wireless signal, the wireless signal providing the user equipment with payload data carried on a high speed physical downlink shared channel (HS-PDSCH), the HS-PDSCH being associated with the HS-SCCH.

2. The user equipment of claim 1, wherein the HS-SCCH comprises a first part and a second part and wherein the code is used by the user equipment for descrambling only the first part of the HS-SCCH.

3. The user equipment of claim 2, wherein the UE ID has a length of 16 bits.

4. The user equipment of claim 3, wherein the circuitry configured to process the UE ID is further configured to process the UE ID and eight zero bits appended to the UE ID to produce the code used by the user equipment for descrambling the first part of the HS-SCCH.

5. The user equipment of claim 4, wherein when the circuitry configured to process the UE ID processes the UE ID and the eight zero bits appended to the UE ID, the circuitry configured to process the UE ID produces a 48 bit code and wherein the user equipment further comprises:
    circuitry configured to puncture 8 bits of the 48 bit code to produce the code used by the user equipment for descrambling the first part of the HS-SCCH.

6. The user equipment of claim 2, wherein the first part of the HS-SCCH includes channelization and modulation information associated with the HS-PDSCH.

7. The user equipment of claim 1, wherein the user equipment supports multimedia services.

8. A user equipment for use in a code division multiple access communication system, the user equipment being configured to monitor a plurality of high speed shared control channels (HS-SCCHs), at least one of the plurality of HS-SCCHs being scrambled at a base station associated with the communication system by a scrambling code and the scrambling code being produced by ½ rate convolutionally encoding a user equipment identification (UE ID) associated with the user equipment, and comprising circuitry configured to descramble the HS-SCCH scrambled by the scrambling code, wherein
    the user equipment is further configured to receive a wireless signal from the base station, the wireless signal providing the user equipment with payload data carried on a high speed physical downlink shared channel (HS-PDSCH), the HS-PDSCH being associated with the HS-SCCH.

9. The user equipment of claim 8, wherein the user equipment is configured to monitor up to four HS-SCCHs.

10. The user equipment of claim 8, wherein the at least one of the plurality of HS-SCCHs comprises a first part and a second part and wherein only the first part of the at least one of the plurality of HS-SCCHs has been scrambled by the scrambling code.

11. The user equipment of claim 10, wherein the first part of the at least one of the plurality of HS-SCCHs includes channelization and modulation information associated with the HS-PDSCH.

12. The user equipment of claim 10, wherein the circuitry configured to descramble the HS-SCCH scrambled by the scrambling code comprises:
    a ½ rate convolutional encoder configured to process the UE ID and eight zero bits appended to the UE ID to produce a 48 bit code;
    circuitry configured to puncture 8 bits of the 48 bit code; and
    circuitry configured to mix the first part of the at least one of the plurality of HS-SCCHs with the punctured 48 bit code.

13. The user equipment of claim 12, wherein the circuitry configured to mix the first part of the at least one of the plurality of HS-SCCHs with the punctured 48 bit code comprises an exclusive-OR gate.

14. The user equipment of claim 8, wherein the UE ID has a length of 16 bits.

15. The user equipment of claim 8, wherein the user equipment supports multimedia services.

16. A base station for use in a code division multiple access communication system, the base station comprising:
    circuitry configured to process information, including a user equipment identification (UE ID), by ½ rate convolutionally encoding the information to produce coded information, the circuit further being configured to generate a scrambling code based on the coded information, the scrambling code being used by the base station for scrambling at least a portion of a high speed shared control channel (HS-SCCH),
    wherein the base station is configured to transmit a wireless signal, the wireless signal providing the user equipment with payload data carried on a high speed physical downlink shared channel (HS-PDSCH), the HS-PDSCH being associated with the HS-SCCH.

17. The base station of claim 16, wherein the portion of the HS-SCCH is a first part of the HS-SCCH, the HS-SCCH comprises a second part, such that the base station scrambles only the first part of the HS-SCCH.

18. The base station of claim 17, wherein the UE ID has a length of 16 bits.

19. The base station of claim 18, wherein the information further includes eight zero bits appended to the UE ID.

20. The base station of claim 19, wherein the coded information is 48 bits in length, wherein the circuitry is further configured to puncture 8 bits of the coded information to produce the scrambling code, the scrambling code being used by the base station to scramble the first part of the HS-SCCH.

21. The base station of claim 17, wherein the first part of the HS-SCCH includes channelization and modulation information associated with the HS-PDSCH.

22. The base station of claim 16, wherein the base station supports multimedia services.

23. A base station for use in a code division multiple access communication system, the base station being configured to transmit control data carried by a plurality of high speed shared control channels (HS-SCCHs), at least a portion of one of the plurality of HS-SCCHs being scrambled by the base station in accordance with a scrambling code, the scrambling code being obtained from coded information, the coded information being generated by ½ rate convolutionally encoding information including a user equipment identification (UE ID), the UE ID corresponding to a user equipment associated with the communication system, wherein the base station is further configured to transmit a wireless signal to the user equipment, the wireless signal providing the user equipment with payload data carried on a high speed physical downlink shared channel (HS-PDSCH), the HS-PDSCH being associated with the HS-SCCH.

24. The base station of claim 23, wherein the portion of the one of the plurality of HS-SCCHs is a first part, the one of the plurality of HS-SCCHs including a second part, such that the base station only scrambles the first part of the one of the plurality of HS-SCCHs.

25. The base station of claim 24, wherein the first part of one of the plurality of HS-SCCHs includes channelization and modulation information associated with the HS-PDSCH.

26. The base station of claim 23, wherein the UE ID has a length of 16 bits.

27. The base station of claim 23, wherein the information further includes eight zero bits appended to the UE ID and the coded information has a length of 48 bits, the base station further comprises:

circuitry configured to puncture 8 bits of the encoded information to generate the scrambling code; and circuitry configured to mix the first part of the one of the plurality of HS-SCCHs with the scrambling code.

28. The base station of claim 27, wherein the circuitry configured to mix the first part of one of the plurality of HS-SCCHs with the scrambling code comprises an exclusive-OR gate.

29. The base station of claim 23, wherein the base station supports multimedia services.

30. A code division multiple access system comprising:

a base station including circuitry configured to process first information, including a user equipment identification (UE ID), by ½ rate convolutionally encoding the first information to produce first coded information, the base station scrambling a high speed shared control channel (HS-SCCH) in accordance with a first scrambling code, the first scrambling code being generated based on the first coded information, wherein the base station is configured to transmit a wireless signal, the wireless signal providing payload data carried on a high speed physical downlink shared channel (HS-PDSCH), the HS-PDSCH being associated with the HS-SCCH; and a user equipment configured to receive the wireless signal transmitted by the base station, the user equipment including circuitry configured to process second information, including the UE ID, by ½ rate convolutionally encoding the second information to generate second coded information, the user equipment descrambling the scrambled HS-SCCH based on a second scrambling code, the second scrambling code being based on the second coded information.

* * * * *

UNITED STATES PATENT AND TRADEMARK OFFICE
CERTIFICATE OF CORRECTION

PATENT NO. : 7,349,540 B2
APPLICATION NO. : 10/779431
DATED : March 25, 2008
INVENTOR(S) : Dick et al.

It is certified that error appears in the above-identified patent and that said Letters Patent is hereby corrected as shown below:

ON THE TITLE PAGE

At Item (56), U.S. PATENT DOCUMENTS, page 2, left column, after the line which begins with "6,188,717", insert
--6,201,811  3/2001   Larsson et al.
  6,208,615  3/2001   Faruque et al.--.

At Item (56), U.S. PATENT DOCUMENTS, page 2, left column, after the line which begins with "6,385,183", insert
--6,430,722  8/2002   Eroz et al.--.

At Item (56), U.S. PATENT DOCUMENTS, page 2, left column, after the line which begins with "6,871,313", insert
--6,915,473  7/2005   Bolourchi et al.--.

At Item (56), U.S. PATENT DOCUMENTS, page 2, left column, after the line which begins with "6,983,412", insert
--7,058,132  6/2006   Sebire et al.--.

At Item (56), U.S. PATENT DOCUMENTS, page 2, left column, after the line which begins with "2003/0005388", insert
--2003/0189918  10/2003   Das et al.--.

At Item (56), U.S. PATENT DOCUMENTS, page 2, left column, line beginning with "2003/0048800", after "3/2003", delete "Kiffoyle et al." and insert therefor --Kilfoyle et al.--.

At Item (56), page 2, left column, line 51, before the word "Finland", delete "Olou" and insert therefor --Oulu--.

At Item (56), page 3, left column, line 4, before the word "Technologies", delete "Lucant" and insert therefor --Lucent--.

At Item (56), page 3, left column, line 10, before the word "Technologies", delete "Lucant" and insert therefor --Lucent--.

At Item (56), page 3, left column, line 38, before the word "Finland", delete "Olou" and insert therefor --Oulu--.

UNITED STATES PATENT AND TRADEMARK OFFICE
CERTIFICATE OF CORRECTION

PATENT NO. : 7,349,540 B2
APPLICATION NO. : 10/779431
DATED : March 25, 2008
INVENTOR(S) : Dick et al.

It is certified that error appears in the above-identified patent and that said Letters Patent is hereby corrected as shown below:

At Item (56), page 3, left column, line 43, before the word "Paris", delete "WGa#25" and insert therefor --WG1#25--.

At Item (56), page 3, right column, line 49, before the word "Specific", insert --UE--.

At Item (56), page 4, left column, line 34, before "TSG-RAN", insert --3GPP--.

At Item (56), page 4, left column, line 37, before "TSG-RAN", insert --3GPP--.

At Item (56), page 4, left column, line 40, before the word "Access", insert --Radio--.

At Item (56), page 4, left column, line 41, after "V5.0.0", delete "(Mar.2003)" and insert therefor --(Mar. 2002--.

At Item (56), page 4, left column, line 54, before the first use of the word "Access", insert --Radio--.

At Item (56), page 4, left column, line 54, after the second use of the word "Access", delete "(HDSPA)", and insert therefor --(HSDPA)--.

At Item (56), page 4, left column, line 56, before the word "Technical", delete "(Mar. 2003)", and insert therefor --(Mar. 2002)--.

At Item (56), page 4, left column, line 57, before the word "Technical", delete "(May 2003)", insert therefor --(Mar. 2002)--.

At Item (56), page 4, left column, line 63, before the first use of the word "Access", insert --Radio--.

At Item (56), page 4, left column, line 67, before the first use of the word "Access", insert --Radio--.

At Item (56), page 4, right column, line 6, before the word "Access", insert --Radio--.

At Item (56), page 4, right column, line 67, after the word "channel", delete "(HS-SCCG)" and insert therefor --(HS-SCCH)--.

UNITED STATES PATENT AND TRADEMARK OFFICE
CERTIFICATE OF CORRECTION

PATENT NO. : 7,349,540 B2
APPLICATION NO. : 10/779431
DATED : March 25, 2008
INVENTOR(S) : Dick et al.

It is certified that error appears in the above-identified patent and that said Letters Patent is hereby corrected as shown below:

IN THE SPECIFICATION

At column 2, line 8, before the words "for a", delete "(HS-SSCH)" and insert therefor --(HS-SCCH)--.

At column 2, line 38, after "UE ID", delete "XUE" and insert therefor --$X_{UE}$--.

At column 2, line 41, before the words "is input", delete "XUE = {XUE1, ..., XUEL}" and insert therefor --$X_{UE} = \{X_{UE1}, ..., X_{UEL}\}$--.

At column 2, line 57, after the word "for", delete "a".

At column 2, line 59, before the words "is input", delete "XUE = {XUE1, ..., XUE16}" and insert therefor --$X_{UE} = \{X_{UE1}, ..., X_{UE16}\}$--.

At column 2, line 62, after the words "string is", delete "XUE1, XUE16" and insert therefor --$X_{UE1}, ..., X_{UE16}$--.

At column 2, line 64, after the word "length", delete "CUE = {CUE1, CUE48}." and insert therefor --$C_{UE} = \{C_{UE1}, ..., C_{UE48}\}$.--.

Signed and Sealed this

Second Day of June, 2009

JOHN DOLL
*Acting Director of the United States Patent and Trademark Office*